US012054301B2

(12) United States Patent
Conti

(10) Patent No.: US 12,054,301 B2
(45) Date of Patent: Aug. 6, 2024

(54) PACKAGING MACHINE FOR MAKING FILTER BAGS WITH INFUSION PRODUCTIONS

(71) Applicant: I.M.A. INDUSTRIA MACCHINE AUTOMATICHE S.p.A., Ozzano Dell'Emilia (IT)

(72) Inventor: Roberto Conti, Imola (IT)

(73) Assignee: I.M.A. INDUSTRIA MACCHINE AUTOMATICHE S.P.A., Ozzano Dell'Emilia (IT)

(*) Notice: Subject to any disclaimer, the term of this patent is extended or adjusted under 35 U.S.C. 154(b) by 247 days.

(21) Appl. No.: 17/642,593

(22) PCT Filed: Sep. 30, 2020

(86) PCT No.: PCT/IB2020/059139

§ 371 (c)(1),
(2) Date: Mar. 11, 2022

(87) PCT Pub. No.: WO2021/064587

PCT Pub. Date: Apr. 8, 2021

(65) Prior Publication Data

US 2022/0332454 A1 Oct. 20, 2022

(30) Foreign Application Priority Data

Sep. 30, 2019 (IT) ........................ 102019000017486

(51) Int. Cl.
*B65B 55/24* (2006.01)
*B08B 5/02* (2006.01)
(Continued)

(52) U.S. Cl.
CPC .............. *B65B 55/24* (2013.01); *B08B 5/026* (2013.01); *B08B 5/046* (2013.01); *B65B 29/028* (2017.08); *B65B 61/06* (2013.01)

(58) Field of Classification Search
None
See application file for complete search history.

(56) References Cited

U.S. PATENT DOCUMENTS

| | | | | |
|---|---|---|---|---|
| 1,700,672 | A | 1/1929 | Doble | |
| 2,118,551 | A * | 5/1938 | Doble | B65B 11/54<br>53/577 |
| 6,148,831 | A * | 11/2000 | Lindstrom | D21G 3/00<br>15/345 |

(Continued)

FOREIGN PATENT DOCUMENTS

| | | | |
|---|---|---|---|
| CN | 101274325 | A | 10/2008 |
| CN | 104936862 | A | 9/2015 |

(Continued)

OTHER PUBLICATIONS

English translation of Japanese Office Action dated Dec. 21, 2023 from counterpart Japanese Patent Application No. 2022-519676.

(Continued)

*Primary Examiner* — Tanzim Imam
(74) *Attorney, Agent, or Firm* — SHUTTLEWORTH & INGERSOLL, PLC; Timothy J. Klima

(57) ABSTRACT

A packaging machine for making filter bags with infusion products including a plurality of processing stations and a cleaning unit. The processing stations define a processing path and are configured for making infusion products. The cleaning unit is configured for removing dust from the processing path and in turn includes a generator device positioned above the processing path and configured for generating a flow of air designed to push the dust beneath the processing path; at least one ventilation grille coupled to the generator device and designed to convey the flow of air along a predetermined direction of emission which extends around the processing path and at least one suction device positioned the processing path and configured for sucking the dust promoting the evacuation from the machine.

11 Claims, 2 Drawing Sheets

(51) Int. Cl.

| | |
|---|---|
| ***B08B 5/04*** | (2006.01) |
| ***B65B 29/02*** | (2006.01) |
| ***B65B 61/06*** | (2006.01) |

(56) References Cited

U.S. PATENT DOCUMENTS

| | | | | |
|---|---|---|---|---|
| 2005/0224373 A1* | 10/2005 | Bailey | B65D 85/8043 | 206/219 |
| 2009/0223015 A1* | 9/2009 | Naide | B65B 55/24 | 15/345 |
| 2017/0333907 A1* | 11/2017 | Berberich | F24F 3/163 | |

FOREIGN PATENT DOCUMENTS

| | | | | |
|---|---|---|---|---|
| CN | 106824964 A * | 6/2017 | B08B 15/04 | |
| CN | 109843727 A | 6/2019 | | |
| DE | 4138168 A1 * | 5/1993 | B01D 45/12 | |
| EP | 806351 A1 * | 11/1997 | B65B 29/02 | |
| EP | 2307151 A1 | 4/2011 | | |
| JP | 2000238728 A | 9/2000 | | |
| JP | 2002362517 A | 12/2002 | | |
| JP | 2004099121 A | 4/2004 | | |
| JP | 2008086963 A | 4/2008 | | |
| JP | 2020117271 A | 8/2020 | | |
| WO | 2007007407 A1 | 1/2007 | | |

OTHER PUBLICATIONS

International Search Report and Written Opinion dated Jan. 14, 2021 from counterpart International Patent Application No. PCT/IB2020/059139.

Chinese Office Action dated Mar. 1, 2023 from counterpart Chinese Patent Application No. 202080068746.X.

* cited by examiner

PACKAGING MACHINE FOR MAKING FILTER BAGS WITH INFUSION PRODUCTIONS

This application is the National Phase of International Application PCT/IB2020/059139 filed Sep. 30, 2020 which designated the U.S.

This application claims priority to Italian Patent Application No. 102019000017486 filed Sep. 30, 2019, which application is incorporated by reference herein.

TECHNICAL FIELD

This invention relates to the technical sector of plants and systems for packaging products.

In particular, the invention relates to a packaging machine for making filter bags with infusion products (such as tea, coffee, chamomile and the like)

BACKGROUND ART

In general, prior art packaging machines comprise a plurality of processing stations at which respective steps are performed which contribute to making filter bags with infusion products.

These filter bags with infusion products are usually made starting from pieces of filter material, which is folded in such a way as to enclose, inside, one or two doses of a substance designed to be infused.

The filter bags are also associated with a thread which allows the filter bag to be connected with a gripping tag, making a product ready for being grouped together and suitably stacked at an outfeed zone of the machine, which is usually followed by a station for final packaging of the infusion products inside suitable containers or boxes.

Before the stacking the filter bags a packaging of each single filter bag can also be carried out using a sheet of overwrapping material suitably folded on the bag to define the typical envelope-like package containing the filter bag.

In general, the production of products of acceptable quality requires both a high precision of the production process in order to guarantee that each bag contains exactly and only a precise quantity of infusion material and an equally perfect operation of the mechanical parts of the packaging stations which make up the machine.

In this context, it is particularly important to be able to perform the production process under conditions of high cleanliness, to prevent any foreign bodies from being transferred and subsequently enclosed inside the bag.

In addition, the movement and the vibrations of the mechanical parts of the machine can generate an accidental falling of small particles of powder product in critical zones of the operating stations with possible deposits of the product which, over time, could damage the mechanical moving parts.

As mentioned above, the term foreign bodies may mean, by way of example, dust, or portions of infusion material incorrectly dispersed inside the processing area and/or along the processing path.

At the same time, the structural complexity typical of packaging machines makes it substantially impossible to carry out a continuous and optimum cleaning without adversely affecting the productivity, resulting in costly machine downtimes, or without necessitating the use or application of cleaning systems which are particularly costly and complex and only justified in very high-end packaging machines.

AIM OF THE INVENTION

In this context, the technical purpose which forms the basis of the invention is to provide a packaging machine which overcomes at least some of the above-mentioned drawbacks of the prior art.

In particular, the aim of the invention is to provide a packaging machine which can be operated in optimum cleanliness conditions in a simple and inexpensive manner.

The technical purpose indicated and the aims specified are substantially achieved by a packaging machine comprising the technical features described in any one of the appended claims.

The invention describes a packaging machine for making filter bags with infusion products which comprises a plurality of processing stations and a cleaning unit.

The processing stations define a processing path and are configured for making filter bags with infusion products.

The cleaning unit is configured for removing dust from the processing path and in turn comprises a generator device positioned above the processing path and configured for generating a flow of air designed to push the dust beneath the processing path; at least one ventilation grille coupled to the generator device and designed to convey the flow of air along a predetermined direction of emission which extends at least around the processing path and at least one suction device positioned the processing path and configured for sucking the dust promoting the evacuation from the machine.

Advantageously, the machine according to the invention obtains in a simple and effective manner an optimum removal of the dust present inside the machine, thus avoiding the build-up of foreign bodies inside it.

The dependent claims, incorporated herein for reference, relate to different embodiments of the invention.

BRIEF DESCRIPTION OF THE DRAWINGS

Further features of the invention and its advantages are more apparent in the non-limiting description below, with reference to a preferred but non-exclusive embodiment of a packaging machine, as illustrated in the accompanying drawings, in which.

DETAILED DESCRIPTION OF PREFERRED EMBODIMENTS OF THE INVENTION

Figure 2:
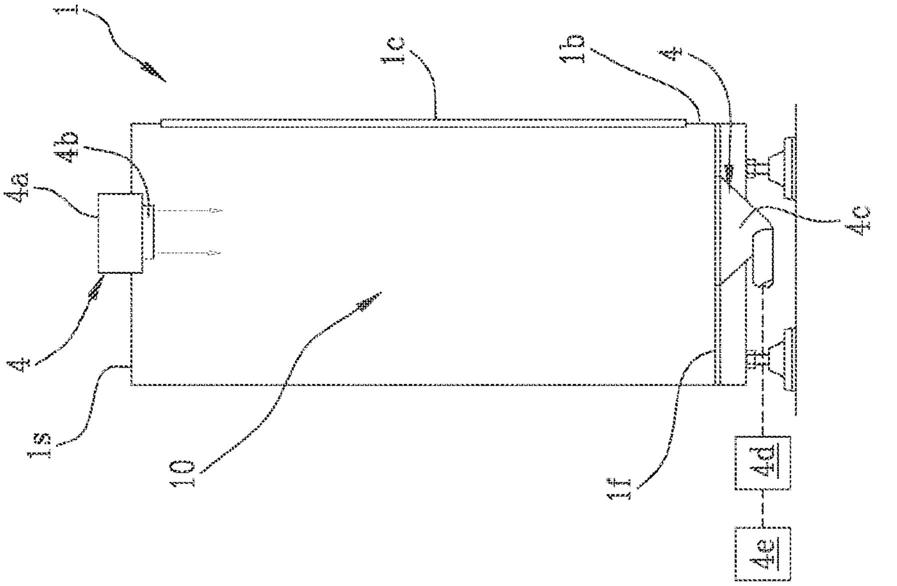
FIGS. 1 and 2 are schematic views of a machine for packaging filter bags with infusion products according to the invention.
Figure 1:
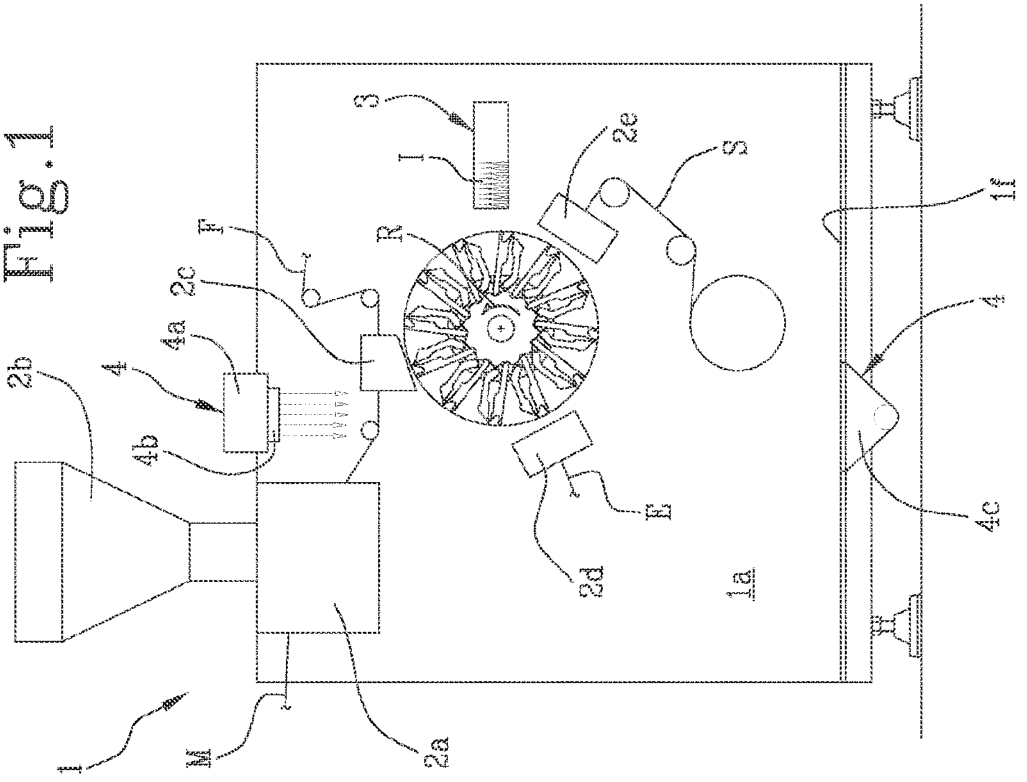
Figure 3:
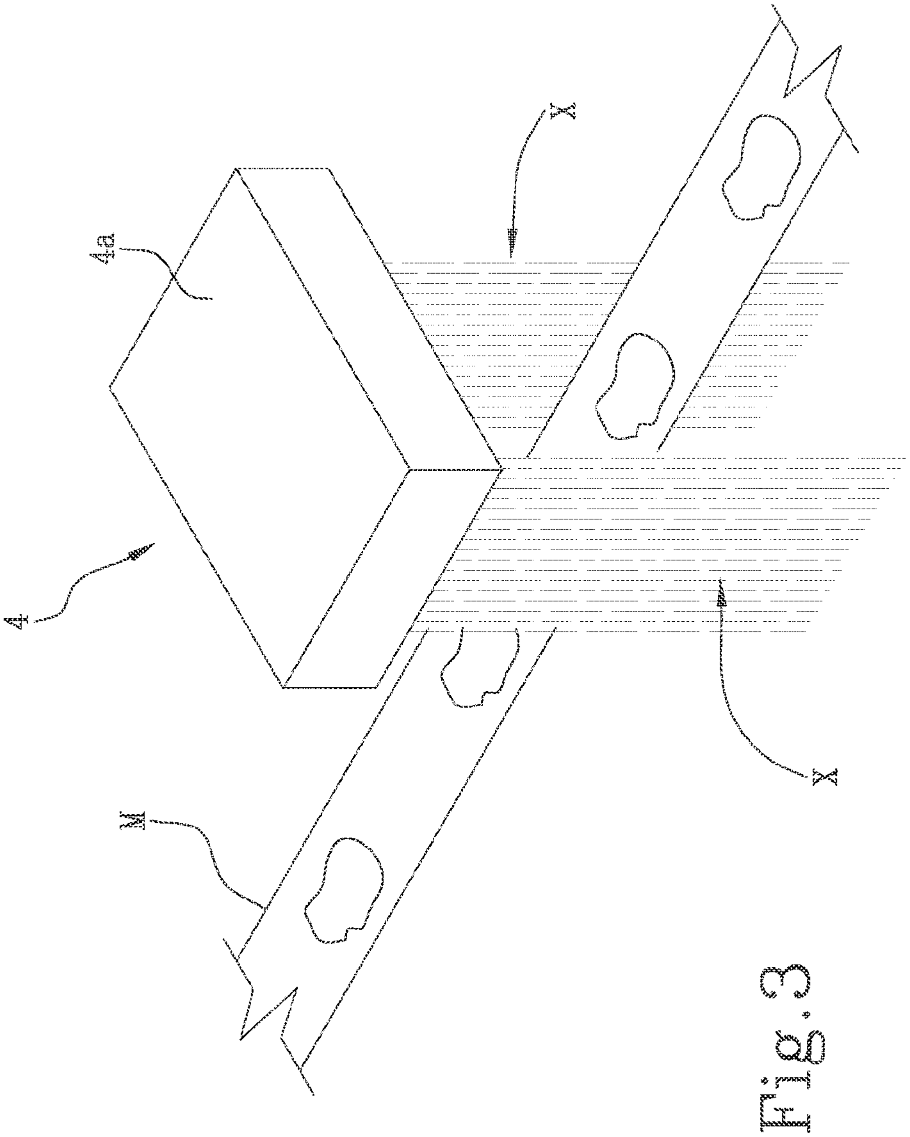
FIG. 3 shows a structural detail of the machine of FIG. 1.

In the accompanying drawings, the numeral 1 generically denotes a machine for packaging filter bags with infusion products, indicated below simply as a packaging machine 1.

The machine 1 comprises a plurality of processing stations 2 positioned according to a precise order aimed at defining a processing path along which filter bags are progressively assembled with infusion products, the filter bag which will be referred to below simply as infusion product "I".

By way of a non-limiting example, the processing stations 2 may comprise a succession of stations designed for making filter bags starting from pieces of filter material and containing a dose (single-lobe bag) or two doses (two-lobed bag) of a substance designed to be infused (such as tea, coffee, natural chamomile or chamomile with added aromatising substances) and applying to these bags a portion of thread having a gripping tag at one end, whilst at the other end the thread is associated with the filter bag.

Optionally, the processing stations may also comprise a station designed to apply a sheet of overwrapping material to the filter bag downstream of the application of the thread and the tag.

For example, the machine 1 may comprise a first processing station 2*a* wherein the doses of substance for infusion (containing in a hopper 2*b*) are placed, at predetermined distances, on a continuous strip formed from filter material "M".

The machine 1 may also comprise a second processing station 2*c* in which the continuous strip on which the doses are placed is cut and folded to form the shape of the infusion product "I" to which the thread "F" is also applied.

The machine 1 also comprises a series of processing stations in which the operations for forming the infusion product "I" are completed.

A third station 2*d* feeds a tag "E" to be applied to the infusion product (tag separated by a continuous web). The tag "E" is then associated with the infusion product "I" and with the thread "F".

A fourth processing station 2*e* wherein a continuous web of overwrapping material "S" is cut into pieces and wrapped around the infusion product "I" completing its formation.

The movement of the infusion products "I" through the various processing stations 2 and therefore along the entire processing path may be advantageously performed by means of a rotary carousel (denoted in the accompanying drawings with the reference "R") having a succession of radial grippers defining seats designed to receive and retain the infusion products "I" being formed and then supply them in sequence to the various processing stations 2 during its rotation.

The machine 1 also comprises an outfeed station 3 situated immediately downstream of the processing path and which receives from it the infusion products "I" to allow the extraction from the machine 1.

The machine 1 further comprises a cleaning unit 4 configured for removing dust from the processing path.

The term "dust" is used to include portions of infusion material which are not correctly positioned or in general any other extraneous agent the presence of which inside the processing path may adversely affect the correct production of the infusion product "I", reduce the overall quality or alter the correct operation of the operating stations.

In other words, the cleaning unit 4 makes it possible to keep the machine clean, especially during its use, and to prevent foreign bodies from entering the infusion products "I".

More in detail, the cleaning unit 4 comprises a generator device 4*a*, a ventilation grille 4*b* and a suction device 4*c*.

The generator device 4*a* is positioned above the processing path and is preferably coupled to an upper wall of the machine 1.

In use, the generator device is configured to generate and emit a flow of air "X", preferably a laminar flow, designed to push the dust downwards (that is, below the processing path).

The generation of a flow which is laminar allows, in effect, the direction and avoids the occurrence, inside the work space of the machine 1, of undesired turbulence.

The ventilation grille 4*b* is coupled to the generator device 4*a* and is configured for conveying the flow of air "X" towards the plurality of processing stations (that is, along a predetermined direction of emission which extends around the processing path).

In other words, the ventilation grille allows the flow of air "X" to be directed according to the operating requirements of the machine 1 or on the basis of the construction architecture of the stations of the machine, in such a way that the latter does not strike the processing path but only the portions of the internal space of the machine 1 immediately adjacent to it.

Consequently, under the action of the ventilation grille 4*b* the flow of air does not strike the processing path and does not interact with the infusion product "I" during its production, pushing solely the dust present in the machine 1 away from the processing path.

Preferably, but not necessarily, the ventilation grille 4*b* is configured for conveying the flow of air "X" close to the continuous strip "M" to an intermediate position between the application station 2*a* and the cutting station 2*c*.

In this way it is possible to guarantee the removal of the dust at a particularly important point of the processing path wherein the infusion material is exposed to possible contamination since it has already left the hopper 2*b* which contained it and it is not yet completely enclosed in the bag made from the continuous web "M".

In addition there is the fact that making this flow laminar (which may even affect a part close to the carousel "R") prevents dust from accumulating on the other parts of the machine located downstream relative to the zone of generation of the flow; a fact which determines a protective barrier.

The suction device 4*c* is, on the other hand, positioned below the processing stations 2 and configured for sucking the flow of air X conveyed by the ventilation grille 4*b*, in such a way as to suck the dust struck by the flow of air X along the processing path.

Preferably, the suction device 4*c* is positioned facing the generator device 4*a* and the ventilation grille 4*b* is configured for conveying the flow of air X along a substantially vertical direction of emission.

The machine 1 comprises a containment chamber 10 housing inside it the plurality of processing stations 2.

The containment chamber 10 is delimited by a bottom wall 1*f*, by a top wall 1*s* (facing the bottom wall 1*f*), by a first vertical wall 1*a* (rear) and a second vertical wall 1*b* (facing the first vertical wall 1*a*).

The second vertical wall 1*b* is equipped with doors 1*c* which keep the chamber 10 isolated from the outside environment, but at the same time allow any inspection of the processing stations 2.

In light of this, the suction device 4*c* is positioned on the bottom wall 1*f* of the containment chamber 10 and faces the generator device 4*a* positioned on the top wall 1*s*.

In light of this, the plurality of processing stations 2 is positioned (that is, extends) on the first vertical wall 1*a* of the containment chamber 10.

The first vertical wall 1*a* extends substantially perpendicularly to the above-mentioned bottom wall 1*f* and to the top wall 1*s*.

The containment chamber 10 therefore defines an environment isolated from external factors, during its operation, and allows the laminar flow of air X a high level of precision in its high-low directionality for the evacuation of the dusty material present inside the containment chamber 10.

Therefore, in use, the suction device is configured to suck the dust, promoting the expulsion from the machine 1.

In general, the various components of the cleaning unit 4 therefore contribute in a synergic fashion to generating a flow of air "X" which flows substantially from the generator device 4*a* to the suction device 4*b* passing around the processing path and along a vertical trajectory.

In this way, the cleaning unit 4, in use, collects and conveys the dust, moving it away from the processing path to guarantee that the machine 1 always operates under optimum cleanliness conditions.

Structurally, the suction device 4*c* comprises a collection chamber, inside of which the dust is conveyed and grouped together, promoting its collection, and a source of negative pneumatic pressure 4*e* coupled to it and connected to a collection unit 4*d* positioned in an environment outside the machine 1 for evacuating the dust.

In particular, the collection chamber has a substantially frustoconical shape positioned in such a way that the larger base faces the processing path.

In other words, the collection chamber substantially has a funnel shape which makes it possible to optimise the collection of the dust.

The source of pneumatic negative pressure, on the other hand, is coupled to the collection chamber with a respective conduit and, as mentioned above, is preferably outside the machine.

Preferably, the suction device 4*c* is positioned directly below the generator device 4*a* and the ventilation grille 4*b* is configured for conveying the flow of air "X" along a substantially vertical direction of emission.

This reduces the length of the path which the dust must follow in order to be removed from the machine 1 and it is therefore possible to minimise the power of the flow of air "X", further reducing the risk of its interaction in particular with the infusion material and in general with the production process of the infusion product "I".

The presence of the cleaning unit 4 inside a containment chamber 10 with a predetermined internal space allows the generator device 4*a* and the suction unit 4*c* to be positioned in such a way as to obtain air flows with precise and accurate direction depending on the type of cleaning necessary and such as to allow a rapid evacuation operation.

According to another aspect of this invention, the cleaning unit 4 may comprise a plurality of generator devices 4*a*, preferably all positioned at the upper wall of the machine 1.

The generator devices 4*a* may be adjacent to each other in such a way as to operate in conjunction to generate the same flow of air "X" or be spaced from each other in such a way as to generate respective flows of air "X" which are independent and not interacting with each other.

In this regard, the cleaning unit 4 may comprise a single ventilation grille 4*b* to which one or more generator devices 4*a* are coupled, or a plurality of distinct ventilation grilles 4*b* each coupled to respective generator devices 4*a* or to respective pluralities of generator devices 4*a*.

In this way it is possible to obtain a particularly accurate directing of each flow of air "X" which is generated inside the machine 1.

Similarly, the cleaning unit 4 may comprise a plurality of suction devices 4*c*, preferably all positioned at the bottom wall 1*f* of the machine 1 and equidistant from each other or in any case positioned according to a regular arrangement aimed at occupying in a uniform fashion the bottom wall.

This feature makes it possible to optimise the collection and removal of the dust without its possible progressive accumulation at the lower part of the machine 1.

In general terms, the machine 1 may comprise a plurality of cleaning units 4 positioned in such a way as to operate on different portions of the processing path, each of which may comprise one or more generator devices 4*a* and/or ventilation grilles 4*b* and/or suction devices 4*c*.

In this way it is possible to generate specific air flows "X" which affect precise portions of the processing path, each directed and modulated as a function of the ambient and operating conditions of the machine 1.

To optimise the directing of the flow of air "X", the ventilation grille 4*b* may comprise adjustable fins which allow the direction of emission to be modified.

The machine may further comprise a control unit (not illustrated) operatively connected to the adjustable fins for modifying the arrangement as a function of an input which can be entered by a user.

In this way it is possible to act quickly on the arrangement of the fins if, following any variation in the operating conditions of the machine 1, it is necessary to modify the direction of emission of the flow of air "X".

Advantageously, the invention achieves the preset aims overcoming the drawbacks of the prior art by providing the user with a packaging machine equipped with a cleaning unit which is simple and inexpensive and which allows removal of the dust and other foreign bodies, if any, from the machine 1, from its processing path in particular, during the machine production operation.

The invention claimed is:

1. A packaging machine for making filter bags with infusion products, the packaging machine comprising:
- a plurality of processing stations defining a processing path and configured for making filter bags; and
- a cleaning unit configured for removing dust from the processing path, said cleaning unit comprising:
  - a generator device positioned above the processing path and configured for generating a flow of air;
  - a ventilation grille coupled to the generator device and configured for conveying the flow of air towards said plurality of processing stations;
  - a suction device positioned below the processing stations and configured for sucking the flow of air conveyed by the ventilation grille to suck dust struck by the flow of air along the processing path;
- wherein the plurality of processing stations comprises:
  - an application station in which a succession of doses of an infusion material is deposited on a respective succession of portions of a continuous strip of filter material;
  - a cutting station in which each portion of the continuous strip is cut and folded around the respective dose of the infusion material;
- wherein said ventilation grille is configured to convey the flow of air in a proximity of the continuous strip to an intermediate position between the application station and the cutting station.

2. The packaging machine according to claim 1, wherein the suction device is positioned facing the generator device and the ventilation grille is configured for conveying the flow of air along a vertical direction of emission.

3. The packaging machine according to claim 1, wherein the cleaning unit comprises a plurality of generator devices and/or a plurality of ventilation grilles and/or a plurality of suction devices.

4. The packaging machine according to claim 1, further comprising a containment chamber housing within it said plurality of processing stations, said suction device being positioned on a bottom wall of said containment chamber.

5. The packaging machine according to claim 4, wherein said plurality of processing stations are positioned on a first vertical wall of said containment chamber, said first vertical wall extending perpendicularly to said bottom wall.

6. The packaging machine according to claim 1, wherein the ventilation grille comprises a plurality of adjustable fins for modulating a direction of emission of the flow of air.

7. The packaging machine according to claim 6, further comprising a control unit acting on said adjustable fins for modifying the direction of emission of the flow of air as a function of an input which is entered by an operator.

8. The packaging machine according to claim 1, wherein the suction device comprises:

a collection chamber configured to promote collection of the dust;

a source of negative pneumatic pressure coupled to the collection chamber and connected with an outside environment for evacuating said dust.

9. The packaging machine according to claim 8, wherein the collection chamber has a frustoconical shape having a larger base facing the processing path.

10. The packaging machine according to claim 8, wherein the source of negative pneumatic pressure is outside the packaging_machine and connected to the collection chamber by a duct.

11. The packaging machine according to claim 1, wherein the generator device is configured for generating a laminar flow of air downwards.

* * * * *